United States Patent
Plowman et al.

(10) Patent No.: US 9,058,668 B2
(45) Date of Patent: Jun. 16, 2015

(54) METHOD AND SYSTEM FOR INSERTING SOFTWARE PROCESSING IN A HARDWARE IMAGE SENSOR PIPELINE

(75) Inventors: David Plowman, Great Chesterford (GB); Gary Keall, Long Clawson (GB); Clive Walker, Cambridge (GB)

(73) Assignee: Broadcom Corporation, Irvine, CA (US)

(*) Notice: Subject to any disclaimer, the term of this patent is extended or adjusted under 35 U.S.C. 154(b) by 1589 days.

(21) Appl. No.: 11/940,788

(22) Filed: Nov. 15, 2007

(65) Prior Publication Data

US 2009/0232347 A9    Sep. 17, 2009

Related U.S. Application Data

(60) Provisional application No. 60/939,914, filed on May 24, 2007.

(51) Int. Cl.
| | |
|---|---|
| G06T 1/20 | (2006.01) |
| G06F 9/38 | (2006.01) |
| G06F 15/78 | (2006.01) |
| H04N 1/00 | (2006.01) |
| H04N 5/243 | (2006.01) |
| H04N 5/335 | (2011.01) |

(52) U.S. Cl.
CPC ............... *G06T 1/20* (2013.01); *G06F 9/3867* (2013.01); *G06F 15/7807* (2013.01); *H04N 1/00307* (2013.01); *H04N 2201/0096* (2013.01); *H04N 5/243* (2013.01); *H04N 5/335* (2013.01)

(58) Field of Classification Search
USPC ....................... 712/10–22; 708/3, 5, 100, 200, 708/230–233; 345/501–506, 519
See application file for complete search history.

(56) References Cited

U.S. PATENT DOCUMENTS

| | | | |
|---|---|---|---|
| 5,686,960 | A | 11/1997 | Sussman et al. |
| 5,886,742 | A | 3/1999 | Hibi et al. |
| 5,973,844 | A | 10/1999 | Burger |
| 6,163,621 | A | 12/2000 | Paik et al. |
| 6,275,532 | B1 | 8/2001 | Hibi et al. |
| 6,285,398 | B1 | 9/2001 | Shinsky et al. |
| 6,933,973 | B1 | 8/2005 | Sako |

(Continued)

OTHER PUBLICATIONS

Bakshi, S.; Gajski, D.D.; , "Partitioning and pipelining for performance-constrained hardware/software systems," Very Large Scale Integration (VLSI) Systems, IEEE Transactions on , vol. 7, No. 4, pp. 419-432, Dec. 1999 doi: 10.1109/92.805749 URL: http://ieeexplore.ieee.org/stamp/stamp.jsp?tp=&arnumber=805749&isnumber=17460.*

(Continued)

*Primary Examiner* — Randolph I Chu
*Assistant Examiner* — Nathan Bloom
(74) *Attorney, Agent, or Firm* — Brinks Gilson & Lione

(57) ABSTRACT

Image data may be processed via one or more stages by a hardware image sensor pipeline (ISP) wherein one or more software processing steps may be inserted at any point within the hardware ISP. Output from any stage of the hardware ISP may be stored in memory. Stored hardware ISP output may be retrieved from memory and processed via one or more software processes. Results from the one or more software processes may be stored in memory and communicated to any stage of the hardware ISP for additional processing. In this regard, the hardware ISP and one or more processors may simultaneously process portions of image data. In addition, the hardware ISP and the one or more processors may be integrated within a chip.

24 Claims, 5 Drawing Sheets

(56) References Cited

U.S. PATENT DOCUMENTS

| | | | |
|---|---|---|---|
| 7,027,665 | B1 | 4/2006 | Kagle et al. |
| 7,359,563 | B1 | 4/2008 | Dua et al. |
| 2001/0021271 | A1 | 9/2001 | Ishibashi |
| 2003/0002746 | A1 | 1/2003 | Kusaka |
| 2003/0077064 | A1 | 4/2003 | Katayama |
| 2004/0218059 | A1* | 11/2004 | Obrador et al. ............ 348/220.1 |
| 2005/0025372 | A1 | 2/2005 | Kim et al. |
| 2005/0078755 | A1 | 4/2005 | Woods et al. |
| 2005/0140787 | A1* | 6/2005 | Kaplinsky .................. 348/207.1 |
| 2006/0090002 | A1* | 4/2006 | Liu ............................... 709/230 |
| 2006/0188014 | A1 | 8/2006 | Civanlar et al. |
| 2006/0274170 | A1 | 12/2006 | Azuma |
| 2007/0065043 | A1* | 3/2007 | Sano ............................. 382/293 |
| 2007/0133870 | A1 | 6/2007 | Hu |
| 2010/0118935 | A1 | 5/2010 | Kakii et al. |

OTHER PUBLICATIONS

Borgatti, M.; Lertora, F.; Foret, B.; Cali, L.; , "A reconfigurable system featuring dynamically extensible embedded microprocessor, FPGA, and customizable I/O," Solid-State Circuits, IEEE Journal of , vol. 38, No. 3, pp. 521-529, Mar. 2003 doi: 10.1109/JSSC.2002.808288.*

Ylvisaker, B.; Van Essen, B.; Ebeling, C.; , "A Type Architecture for Hybrid Micro-Parallel Computers," Field-Programmable Custom Computing Machines, 2006. FCCM '06. 14th Annual IEEE Symposium on , vol., No., pp. 99-110, Apr. 24-26, 2006 doi: 10.1109/FCCM.2006.20.*

Stephanie McBader, Peter Lee, "An FPGA Implementation of a Flexible, Parallel Image Processing Architecture Suitable for Embedded Vision Systems," Parallel and Distributed Processing Symposium, International, p. 228a, International Parallel and Distributed Processing Symposium (IPDPS'03), 2003.*

Blodget, B.; McMillan, S.; Lysaght, P.; , "A lightweight approach for embedded reconfiguration of FPGAs," Design, Automation and Test in Europe Conference and Exhibition, 2003 , vol., No., pp. 399-400, 2003 doi: 10.1109/Date.2003.1253642 URL: http://ieeexplore.ieee.org/stamp/stamp.jsp?tp=&arnumber=1253642&isnumber=26600.*

Heather Quinn, "Runtime tools for hardware/software systems with reconfigurable hardware", Electrical and Computer Engineering of Northeastern University, Boston, MA, Aug. 2004 PhD Thesis.*

T. Marescaux, V. Nollet, J.-Y. Mignolet, A. Bartic, W. Moffat, P. Avasare, P. Coene, D. Verkest, S. Vernalde, R. Lauwereins, Run-time support for heterogeneous multitasking on reconfigurable SoCs, Integration, the VLSI Journal, vol. 38, Issue 1, Oct. 2004, pp. 107-130, ISSN 0167-9260.*

Office Action dated Mar. 8, 2011 for U.S. Appl. No. 11/682,536, filed Mar. 6, 2007.

Office Action dated Nov. 9, 2010 for U.S. Appl. No. 11/682,536, filed Mar. 6, 2007.

Office Action dated May 18, 2010 for U.S. Appl. No. 11/682,536, filed Mar. 6, 2007.

Office Action dated Apr. 27, 2011 for U.S. Appl. No. 11/939,956, filed Nov. 14, 2007.

Jiajun Zhang; Ahmad, M.O.; Swamy, M.N.S.;, "Overlapped variable size block motion compensation," Image Processing, 1997. Proceedings., International Conference on , vol. 3, No., pp. 642-645 vol. 3, Oct. 26-29, 1997 doi: 10.1109/ICIP.1997.632203 URL: http://ieeexplore.ieee.org/stamp/stamp.jsp?tp-&arnumber=632203&isnumber=13718.

* cited by examiner

METHOD AND SYSTEM FOR INSERTING SOFTWARE PROCESSING IN A HARDWARE IMAGE SENSOR PIPELINE

CROSS-REFERENCE TO RELATED APPLICATIONS/INCORPORATION BY REFERENCE

This application makes reference to, claims priority to, and claims the benefit of U.S. Provisional Application Ser. No. 60/939,914, filed on May 24, 2007, which is hereby incorporated herein by reference in its entirety.

FIELD OF THE INVENTION

Certain embodiments of the invention relate to processing of images. More specifically, certain embodiments of the invention relate to a method and system for inserting software processing in a hardware image sensor pipeline.

BACKGROUND OF THE INVENTION

For many people, mobile or hand held electronic devices have become a part of everyday life. Mobile devices have evolved from a convenient method for voice communication to multi functional resources that offer, for example, camera features, media playback, electronic gaming, internet browsing, email and office assistance.

Cellular phones with built-in cameras, or camera phones, have become prevalent in the mobile phone market, due to the low cost of CMOS image sensors and the ever increasing customer demand for more advanced cellular phones.

Historically, the resolution of camera phones has been limited in comparison to typical digital cameras. In this regard, they must be integrated into the small package of a cellular handset, limiting both the image sensor and lens size. In addition, because of the stringent power requirements of cellular handsets, large image sensors with advanced processing have been difficult to incorporate. However, due to advancements in image sensors, multimedia processors, and lens technology, the resolution of camera phones has steadily improved rivaling that of many digital cameras.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A method and system for inserting software processing in a hardware image sensor pipeline, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain aspects of the invention may be found in a method and system for inserting software processing between hardware image sensor pipeline (ISP) processing stages on a mobile imaging device. Data may be tapped or removed from any stage of the hardware image sensor pipeline and sent to a software process for processing. The resulting software processed data may then be reinserted at any stage of the hardware image sensor pipeline for processing. Data may be tapped from the hardware ISP, communicated to a software process, and reinserted back into any point of the hardware image sensor pipeline as many times as may be necessary for processing. In this regard, the hardware ISP may comprise a plurality of hardware processing stages wherein one or more hardware processing stages may be communicatively coupled with random access memory and/or one or more processors. The hardware ISP, one or more processors and/or memory may be integrated on a chip. A processor may direct transmission of mega pixel images from an image source to the hardware ISP. Image data may be received and processed by one or more hardware stages within the hardware ISP and a processed output may be stored in memory. Subsequently, a processor may retrieve the hardware ISP processed output from memory, perform one or more software processing steps and store the results in memory. The processor may signal any ISP hardware stage to fetch the software processing output from memory for additional processing within the hardware ISP if needed. The processed image data output from any hardware ISP stage or software processing step may be stored in for future use. Accordingly, the hardware ISP as well as one or more processors may simultaneously process different portions of image data. Utilizing software for image data processing enables modification of processing algorithms and/or techniques while utilizing the same hardware. In some embodiments of the invention, image data may be processed in a tiled format.

Figure 1A:
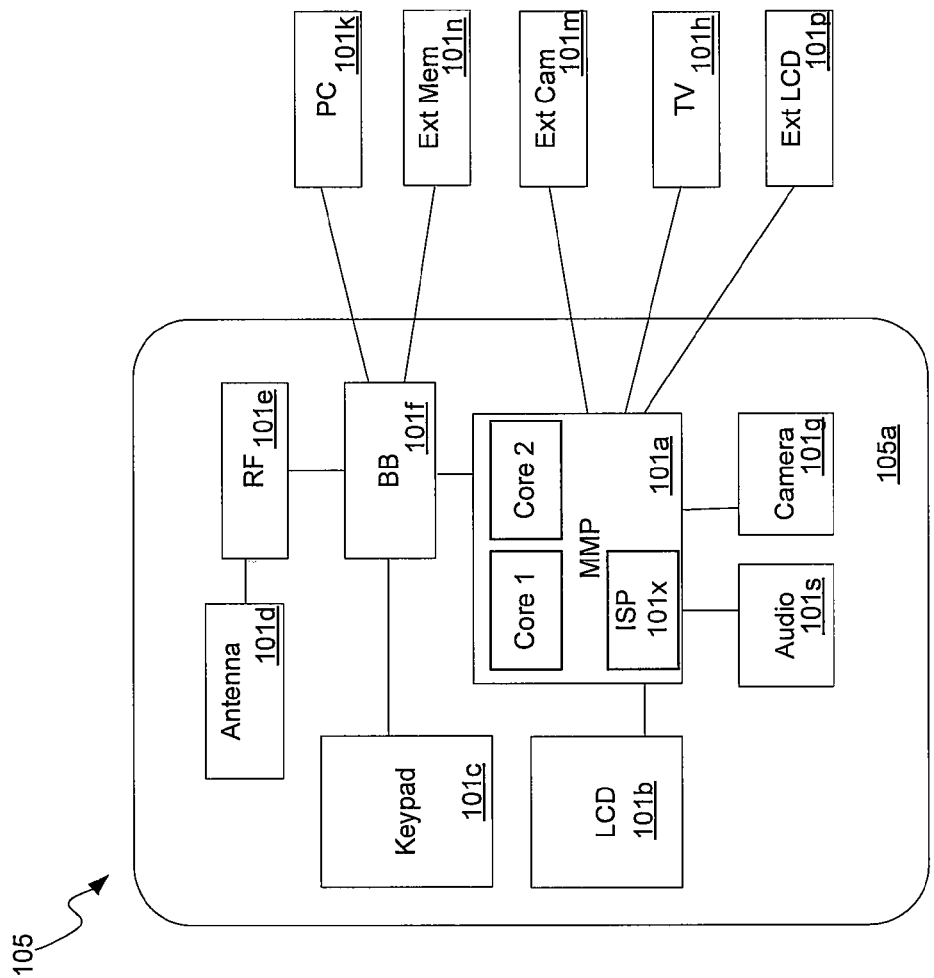
FIG. 1A is a block diagram of an exemplary mobile multimedia system, in accordance with an embodiment of the invention.

FIG. 1A is a block diagram of an exemplary mobile multimedia system, in accordance with an embodiment of the invention. Referring to FIG. 1A, there is shown a mobile multimedia system 105 that comprises a mobile multimedia device 105a, a TV 101h, a PC 101k, an external camera 101m, external memory 101n, and external LCD display 101p. The mobile multimedia device 105a may be a cellular telephone or other handheld communication device. The mobile multimedia device 105a may comprise a mobile multimedia processor (MMP) 101a, an antenna 101d, an audio block 101s, a radio frequency (RF) block 101e, a baseband processing block 101f, an LCD display 101b, a keypad 101c, and a camera 101g.

The MMP 101*a* may comprise suitable circuitry, logic, and/or code and may be adapted to perform video and/or multimedia processing for the mobile multimedia device 105*a*. The MMP 101*a* may further comprise a plurality of processor cores, indicated in FIG. 1A by Core 1 and Core 2 as well as a hardware image sensor pipeline (ISP) 101*x*. The MMP 101*a* may also comprise integrated interfaces, which may be utilized to support one or more external devices coupled to the mobile multimedia device 105*a*. For example, the MMP 101*a* may support connections to a TV 101*h*, a PC 101*k*, an external camera 101*m*, external memory 101*n*, and an external LCD display 101*p*.

In operation, the mobile multimedia device may receive signals via the antenna 101*d*. Received signals may be processed by the RF block 101*e* and the RF signals may be converted to baseband by the baseband processing block 101*f*. Baseband signals may then be processed by the MMP 101*a*. Audio and/or video data may be received from the external camera 101*m*, and image data may be received via the integrated camera 101*g*. The image data may be forwarded to the hardware ISP 101*x* for a plurality of image data processing steps. During processing, the image data may be passed between the hardware ISP and one or more of the MMP 101*a* processor cores for software processing. Image processing software may be modifiable providing flexibility in processing algorithms and/or techniques. In some embodiments of the invention, concurrent processing operations may occur within one or more MMP 101*a* processing cores and within the hardware ISP 101*x*. In this manner, software processing may not reduce the speed of processing via the hardware ISP. Image data may be processed in tile format, which may reduce the memory requirements for buffering of data during processing. During processing, the MMP 101*a* may utilize the external memory 101*n* for storing processed data. Processed audio data may be communicated to the audio block 101*s* and processed video data may be communicated to the LCD 101*b* or the external LCD 101*p*, for example. The keypad 101*c* may be utilized for communicating processing commands and/or other data, which may be required for audio or video data processing by the MMP 101*a*.

Figure 1B:
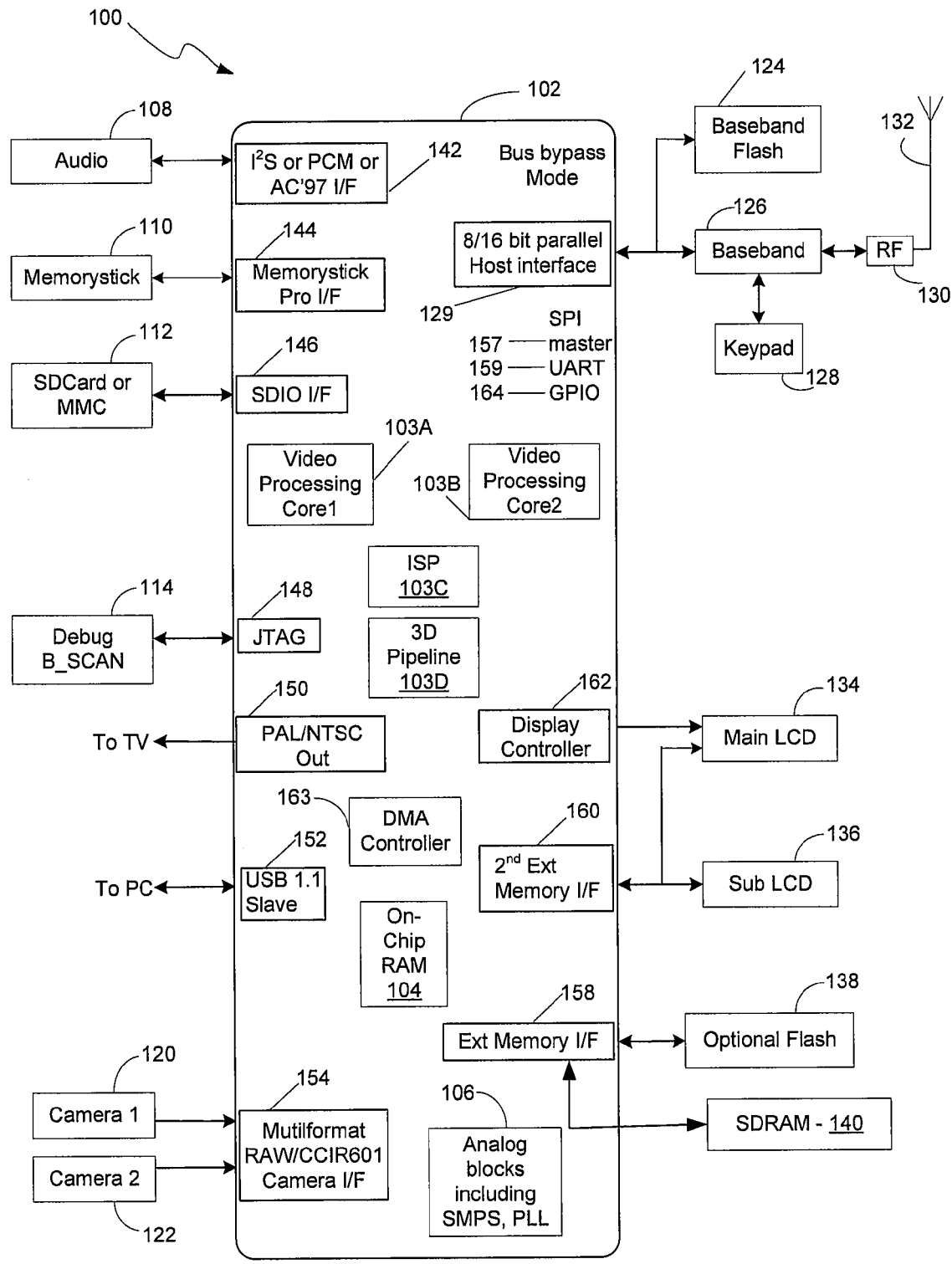
FIG. 1B is a block diagram of an exemplary mobile multimedia processor, in accordance with an embodiment of the invention.

FIG. 1B is a block diagram of an exemplary mobile multimedia processor, in accordance with an embodiment of the invention. Referring to FIG. 1B, the mobile multimedia processor 102 may comprise suitable logic, circuitry and/or code that may be adapted to perform video and/or multimedia processing for handheld multimedia products. For example, the mobile multimedia processor 102 may be designed and optimized for video record/playback, mobile TV and 3D mobile gaming, utilizing integrated peripherals and a video processing core. The mobile multimedia processor 102 may comprise video processing cores 103A and 103B, RAM 104, an analog block 106, a direct memory access (DMA) controller 163, an audio interface (I/F) 142, a memory stick I/F 144, SD card I/F 146, JTAG I/F 148, TV output I/F 150, USB I/F 152, a camera I/F 154, and a host I/F 129. The mobile multimedia processor 102 may further comprise a serial peripheral interface (SPI) 157, a universal asynchronous receiver/transmitter (UART) I/F 159, general purpose input/output (GPIO) pins 164, a display controller 162, an external memory I/F 158, and a second external memory I/F 160.

The video processing cores 103A and 103B may comprise suitable circuitry, logic, and/or code and may be adapted to perform video processing of data. The RAM 104 may comprise suitable logic, circuitry and/or code that may be adapted to store on-chip data such as video data. In an exemplary embodiment of the invention, the RAM 104 may be adapted to store 10 Mbits of on-chip data, for example. The size of the on-chip RAM 104 may vary depending on cost or other factors such as chip size.

The hardware image sensor pipeline (ISP) 103C may comprise suitable circuitry, logic and/or code that may enable the processing of image data. The hardware ISP 103C may perform a plurality of processing techniques comprising dark pixel compensation, lens shading correction, white balance and gain control, defective pixel correction, resampling, crosstalk correction, bayer denoising, demosaicing, gamma correction, YCbCr denoising, false color suppression, sharpening, distortion correction, high resolution resize, color processing, color conversion, low resolution resize and output formatting, for example. The hardware ISP 103C may be communicatively coupled with the video processing cores 103A and/or 103B via the on-chip RAM 104. The processing of image data may be performed on variable sized tiles, reducing the memory requirements of the hardware ISP 103C processes. In accordance with an embodiment of the invention, the hardware image sensor pipeline 103C may be tapped at any point and resulting tapped data may be communicated to a software process for handling. The resulting software processed data may then be reinserted back into the hardware image sensor pipeline 103C at any stage or point for continued processing. Data may be tapped from the hardware image sensor pipeline 103C at any point, communicated to a software process for processing, and reinserted back into any point of the hardware ISP hardware pipeline 103C as may times as may be necessary for processing.

The analog block 106 may comprise a switch mode power supply (SMPS) block and a phase locked loop (PLL) block. In addition, the analog block 106 may comprise an on-chip SMPS controller, which may be adapted to generate its core voltage. The core voltage may be software programmable according to, for example, speed demands on the mobile multimedia processor 102, allowing further control of power management.

In an exemplary embodiment of the invention, the normal core operating range may be about 0.8 V-1.2 V and may be reduced to about 0.6 V during hibernate mode. The analog block 106 may also comprise a plurality of PLL's that may be adapted to generate about 195 kHz-200 MHz clocks, for example, for external devices. Other voltages and clock speeds may be utilized depending on the type of application. The mobile multimedia processor 102 may comprise a plurality of power modes of operation, for example, run, sleep, hibernate and power down. In accordance with an embodiment of the invention, the mobile multimedia processor 102 may comprise a bypass mode that may allow a host to access memory mapped peripherals in power down mode, for example. In bypass mode, the mobile multimedia processor 102 may be adapted to directly control the display during normal operation while giving a host the ability to maintain the display during standby mode.

The audio block 108 may comprise suitable logic, circuitry and/or code that may be adapted to communicate with the mobile multimedia processor 102 via an inter-IC sound ($I^2S$), pulse code modulation (PCM) or audio codec (AC'97) interface 142 or other suitable interface, for example. In the case of an AC'97 and/or an $I^2S$ interface, suitable audio controller, processor and/or circuitry may be adapted to provide AC'97 and/or $I^2S$ audio output respectively, in either master or slave mode. In the case of the PCM interface, a suitable audio controller, processor and/or circuitry may be adapted to allow input and output of telephony or high quality stereo audio. The PCM audio controller, processor and/or circuitry may comprise independent transmit and receive first in first out (FIFO) buffers and may use DMA to further reduce processor overhead. The audio block 108 may also comprise an audio in, audio out port and a speaker/microphone port (not illustrated in FIG. 1B).

The mobile multimedia device 100 may comprise at least one portable memory input/output (I/O) block. In this regard, the memorystick block 110 may comprise suitable logic, circuitry and/or code that may be adapted to communicate with the mobile multimedia processor 102 via a memorystick pro interface 144, for example. The SD card block 112 may comprise suitable logic, circuitry and/or code that may be adapted to communicate with the mobile multimedia processor 102 via a SD input/output (I/O) interface 146, for example. A multimedia card (MMC) may also be utilized to communicate with the mobile multimedia processor 102 via the SD input/output (I/O) interface 146, for example. The mobile multimedia device 100 may comprise other portable memory I/O blocks such an xD I/O card.

The debug block 114 may comprise suitable logic, circuitry and/or code that may be adapted to communicate with the mobile multimedia processor 102 via a joint test action group (JTAG) interface 148, for example. The debug block 114 may be adapted to access the address space of the mobile multimedia processor 102 and may be adapted to perform boundary scan via an emulation interface. Other test access ports (TAPs) may be utilized. The phase alternate line (PAL)/national television standards committee (NTSC) TV output I/F 150 may be utilized for communication with a TV, and the universal serial bus (USB) 1.1, or other variant thereof, slave port I/F 152 may be utilized for communications with a PC, for example. The cameras 120 and/or 122 may comprise suitable logic, circuitry and/or code that may be adapted to communicate with the mobile multimedia processor 102 via a multiformat raw CCIR 601 camera interface 154, for example. The camera I/F 154 may utilize windowing and sub-sampling functions, for example, to connect the mobile multimedia processor 102 to a mobile TV front end.

The mobile multimedia processor 102 may also comprise a plurality of serial interfaces, such as the USB I/F 152, a serial peripheral interface (SPI) 157, and a universal asynchronous receiver/transmitter (UART) I/F 159 for Bluetooth or IrDA. The SPI master interface 157 may comprise suitable circuitry, logic, and/or code and may be utilized to control image sensors. Two chip selects may be provided, for example, to work in a polled mode with interrupts or via a DMA controller 163. Furthermore, the mobile multimedia processor 102 may comprise a plurality of general purpose I/O (GPIO) pins 164, which may be utilized for user defined I/O or to connect to the internal peripherals. The display controller 162 may comprise suitable circuitry, logic, and/or code and may be adapted to support multiple displays with XGA resolution, for example, and to handle 8/9/16/18/21-bit video data.

The baseband flash memory 124 may be adapted to receive data from the mobile multimedia processor 102 via an 8/16 bit parallel host interface 129, for example. The host interface 129 may be adapted to provide two channels with independent address and data registers through which a host processor may read and/or write directly to the memory space of the mobile multimedia processor 102. The baseband processing block 126 may comprise suitable logic, circuitry and/or code that may be adapted to convert RF signals to baseband and communicate the baseband processed signals to the mobile multimedia processor 102 via the host interface 129, for example. The RF processing block 130 may comprise suitable logic, circuitry and/or code that may be adapted to receive signals via the antenna 132 and to communicate RF signals to the baseband processing block 126. The host interface 129 may comprise a dual software channel with a power efficient bypass mode.

The main LCD 134 may be adapted to receive data from the mobile multimedia processor 102 via a display controller 162 and/or from a second external memory interface 160, for example. The display controller 162 may comprise suitable logic, circuitry and/or code and may be adapted to drive an internal TV out function or be connected to a range of LCD's. The display controller 162 may be adapted to support a range of screen buffer formats and may utilize direct memory access (DMA) to access the buffer directly and increase video processing efficiency of the video processing core 103. Both NTSC and PAL raster formats may be generated by the display controller 162 for driving the TV out. Other formats, for example SECAM, may also be supported.

In one embodiment of the invention, the display controller 162 may be adapted to support a plurality of displays, such as an interlaced display, for example a TV, and/or a non-interlaced display, such as an LCD. The display controller 162 may also recognize and communicate a display type to the DMA controller 163. In this regard, the DMA controller 163 may be fetch video data in an interlaced or non-interlaced fashion for communication to an interlaced or non-interlaced display coupled to the mobile multimedia processor 102 via the display controller 162.

The substitute LCD 136 may comprise suitable logic, circuitry and/or code that may be adapted to communicate with the mobile multimedia processor 102 via a second external memory interface, for example. The mobile multimedia processor 102 may comprise a RGB external data bus. The mobile multimedia processor 102 may be adapted to scale image output with pixel level interpolation and a configurable refresh rate.

The optional flash memory 138 may comprise suitable logic, circuitry and/or code that may be adapted to communicate with the mobile multimedia processor 102 via an external memory interface 158, for example. The optional SDRAM 140 may comprise suitable logic, circuitry and/or code that may be adapted to receive data from the mobile multimedia processor 102 via the external memory interface 158, for example. The external memory I/F 158 may be utilized by the mobile multimedia processor 102 to connect to external SDRAM 140, SRAM, Flash memory 138, and/or external peripherals, for example. Control and timing information for the SDRAM 140 and other asynchronous devices may be configurable by the mobile multimedia processor 102.

The mobile multimedia processor 102 may further comprise a secondary memory interface 160 to connect to connect to memory-mapped LCD and external peripherals, for example. The secondary memory interface 160 may comprise suitable circuitry, logic, and/or code and may be utilized to connect the mobile multimedia processor 102 to slower devices without compromising the speed of external memory access. The secondary memory interface 160 may provide 16 data lines, for example, 6 chip select/address lines, and programmable bus timing for setup, access and hold times, for example. The mobile multimedia processor 102 may be adapted to provide support for NAND/NOR Flash including NAND boot and high speed direct memory access (DMA), for example.

In operation, the mobile multimedia processor 102 may be integrated with a hardware image sensor pipeline (ISP) 103C. In this regard, a plurality of image processing steps may be performed on a unit of image data wherein a portion of the steps may be performed in various stages of hardware by the hardware ISP 103C and/or another portion of processing steps may be performed in software by one or more processing cores 103A and/or 103B for example. Image processing steps may comprise dark pixel compensation, lens shading correction, white balance and gain control, defective pixel correction, resampling, crosstalk correction, bayer denoising, demosaicing, gamma correction, YCbCr denoising, false color suppression, sharpening, distortion correction, high resolution resize, color processing, color conversion, low resolution resize and output formatting for example. Output from one or more of the image processing steps may be stored for future or alternative use.

Figure 2A:
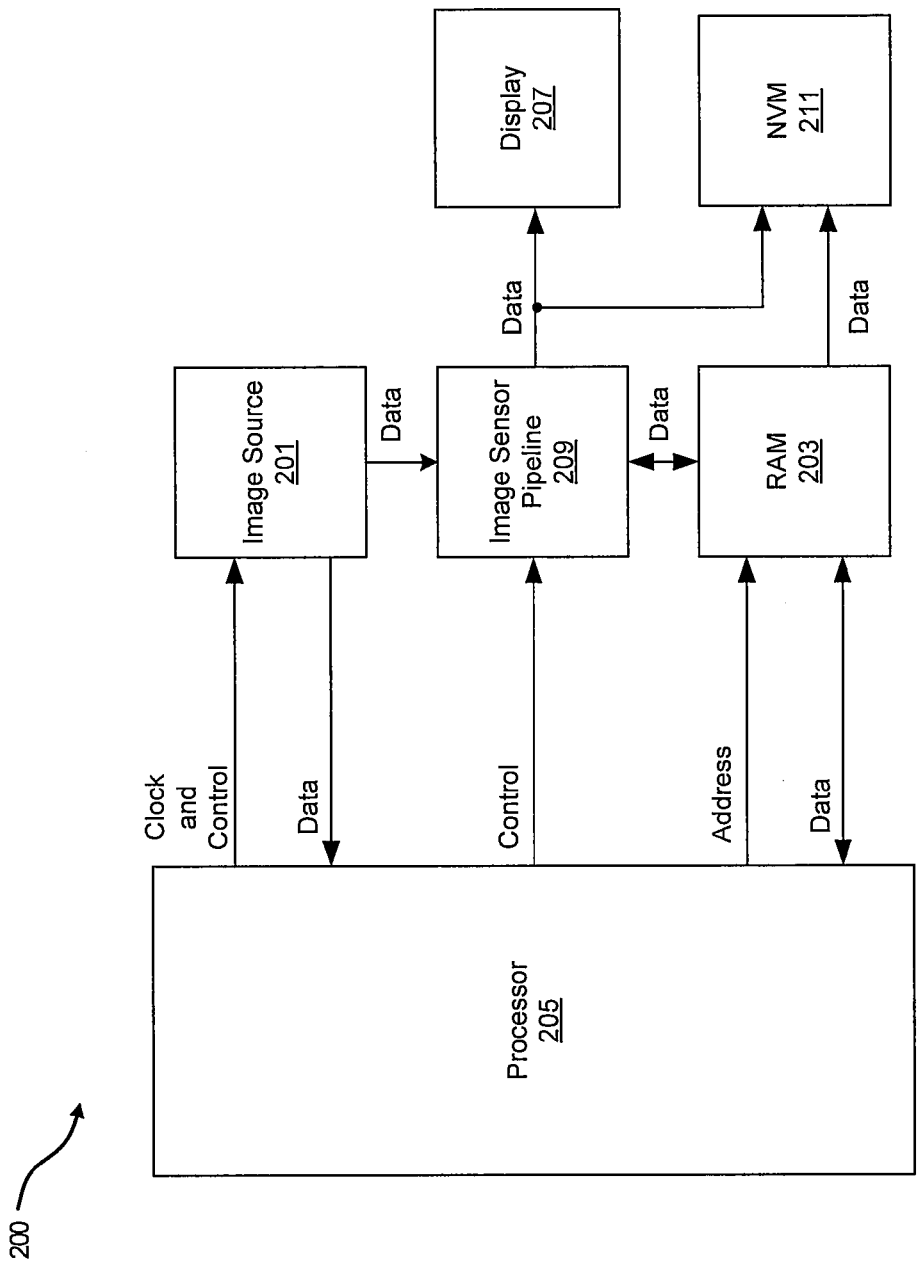
FIG. 2A is a block diagram of an exemplary mobile device configured to perform image processing via a hardware image sensor pipeline (ISP) and a software program executed by a processor, in accordance with an embodiment of the invention.

FIG. 2A is a block diagram of an exemplary mobile device configured to perform image processing via a hardware image sensor pipeline (ISP) and a software program executed by a processor, in accordance with an embodiment of the invention. Referring to FIG. 2A, there is shown an image processing system 200 comprising an image source 201, a random access memory (RAM) 203, a processing block 205, a display 207, a hardware image sensor pipeline (ISP) 209 and a non-volatile memory (NVM) 211.

The image source 201 may comprise suitable circuitry, logic and or code to detect a visual image and convert light to an electrical signal representing the image. In this regard, the image source 201 may comprise, for example, a multi-mega pixel charged-coupled device (CCD) array, a complimentary metal oxide semiconductor (CMOS) array or another related technology. The image source 201 may be communicatively coupled with the RAM 203 and the processing block 205.

The processing block 205 may comprise suitable circuitry, logic and/or code that may be enabled to process image data via software program and to manage and/or regulate image processing in tasks among a plurality of functional units comprising the image source 201, hardware ISP 209, RAM 203, display 207 and NVM 211. The processing block 205 may be similar or substantially the same as the mobile multimedia processor (MMP) 101a described with respect to FIG. 1A and/or the MMP 102 described with respect to FIG. 1B. The processing block 205 may exchange image data with the image source 201, the hardware ISP 209, the RAM 203 and/or the NVM 211. The processing block 205 may be enabled to perform software image processing tasks or steps comprising dark pixel compensation, lens shading correction, white balance and gain control, defective pixel correction, resampling, crosstalk correction, bayer denoising, demosaicing, gamma correction, YCbCr denoising, false color suppression, sharpening, distortion correction, high resolution resize, color processing, color conversion, low resolution resize and output formatting for example. In this regard, the processing block 205 may be enabled to receive image data output from any processing stage in the hardware ISP 209 and to perform software image processing steps on the received image data. The output from software image processing steps may be sent to the RAM 203. The processor 205 may issue a command to the hardware ISP 209 to fetch the software processed image data in RAM 203 and to further process the fetched image data. Software image processing steps may be inserted before or after any stage of image processing within the hardware ISP hardware. Moreover, image data output from any software or hardware processing step or stage may be stored in the NMM 211 for future use. The processing block 205 may direct processed image data to the display 207 and/or the NVM 211. Image data may be processed in variable size tiles.

The display 207 may comprise suitable circuitry, logic and/or code for displaying an image received from the system 200 and/or a storage device. The display 207 may receive control information and/or commands from the processor 205 and may be communicatively coupled with the processor 205, hardware ISP 209, RAM 203 and/or the NVM 211.

The RAM 203 may comprise suitable circuitry, logic and/or code for storing data. The RAM 203 may be similar or substantially the same as the RAM 104 described in FIG. 1B. The RAM 203 may be utilized to store image data after various steps or stages of processing, for example, during an exchange of image data between the hardware ISP 209 and processor 205. In addition, the RAM 203 may store configuration data related to image processing. For example, characteristics of the image source 201 may be measured at the time of manufacture, and the distortion of the optics across a resulting image may be stored in the RAM 203.

The hardware ISP 209 may comprise suitable circuitry, logic and/or code that may enable processing of image data received from the image source 201. The hardware ISP 209 may comprise circuitry allocated for image processing tasks such as steps or stages comprising dark pixel compensation, lens shading correction, white balance and gain control, defective pixel correction, resampling, crosstalk correction, bayer denoising, demosaicing, gamma correction, YCbCr denoising, false color suppression, sharpening, distortion correction, high resolution resize, color processing, color conversion, low resolution resize and output formatting for example. Processing steps or stages may be performed by hardware in the hardware ISP 209 and/or by software stored in the RAM 203 and executed by the processor 205. In this regard, image processing performed via software processes may be inserted before or after one or more of the hardware ISP image processing stages. The processor 205 may issue a command to the hardware ISP 209 to fetch the software processed image data in RAM 203 and to further process the fetched image data.

The NVM 211 may comprise suitable circuitry, logic and/or code for storing data. In various embodiments of the invention, the NVM 211 may be similar to or substantially the same as the memorystick block 110, the baseband flash memory 124, the optional flash memory 138 and/or the SDRAM 140 described in FIG. 1B for example. The NVM 211 may be communicatively coupled to the RAM 203, processing block 205 and/or the hardware ISP 209.

In operation, the processor 205 may receive image data from the image source 201. The processor 205 may provide clock and control signals for synchronizing transfer of image data from the image source 201. Image data may be in tiled format and processing may begin when a tile is received. The size of tiles may be determined by distortion in the image data that may be due to optical effects. Smaller sized tiles may be utilized in areas of the image where there may be higher distortion, such as around the edges, for example. The tile sizes may be determined by the distortion characteristics stored in the RAM 203. The image data may be passed to the hardware ISP for various processing steps, for example, dark pixel compensation, lens shading correction, white balance and gain control, defective pixel correction, resampling, crosstalk correction, bayer denoising, demosaicing, gamma correction, YCbCr denoising, false color suppression, sharpening, distortion correction, high resolution resize, color processing, color conversion, low resolution resize and output formatting.

The output of one or more hardware ISP image processing steps may be stored in the RAM 203. The processor 205 may fetch the image data from the RAM 203 and may perform one or more image processing steps via software. The output from the software processing steps may be returned to RAM 203. The processor 205 may direct a subsequent hardware processing step within the hardware ISP to fetch the software processed image data from the RAM 203 and to continue image processing steps within the hardware ISP 209. Accordingly, the hardware ISP 209 is capable of being tapped at any point and resulting tapped data may be communicated to a software process for handling. The resulting software processed data may then be reinserted back into the hardware image sensor pipeline 209 at any stage or point for continued processing. Data may be tapped from the hardware image sensor pipeline 209 at any point, communicated to a software process for processing, and reinserted back into any point of the hardware ISP pipeline 103C as may times as may be necessary for processing.

The data may be stored in the RAM 203 prior to being communicated to the display 207. The processor 205 may communicate address data to the RAM 203 to determine where to read or write processed image data in the RAM 203. Output from various intermediate steps or a final step of image processing may be may be stored for future use in the NVM 211.

Figure 2B:
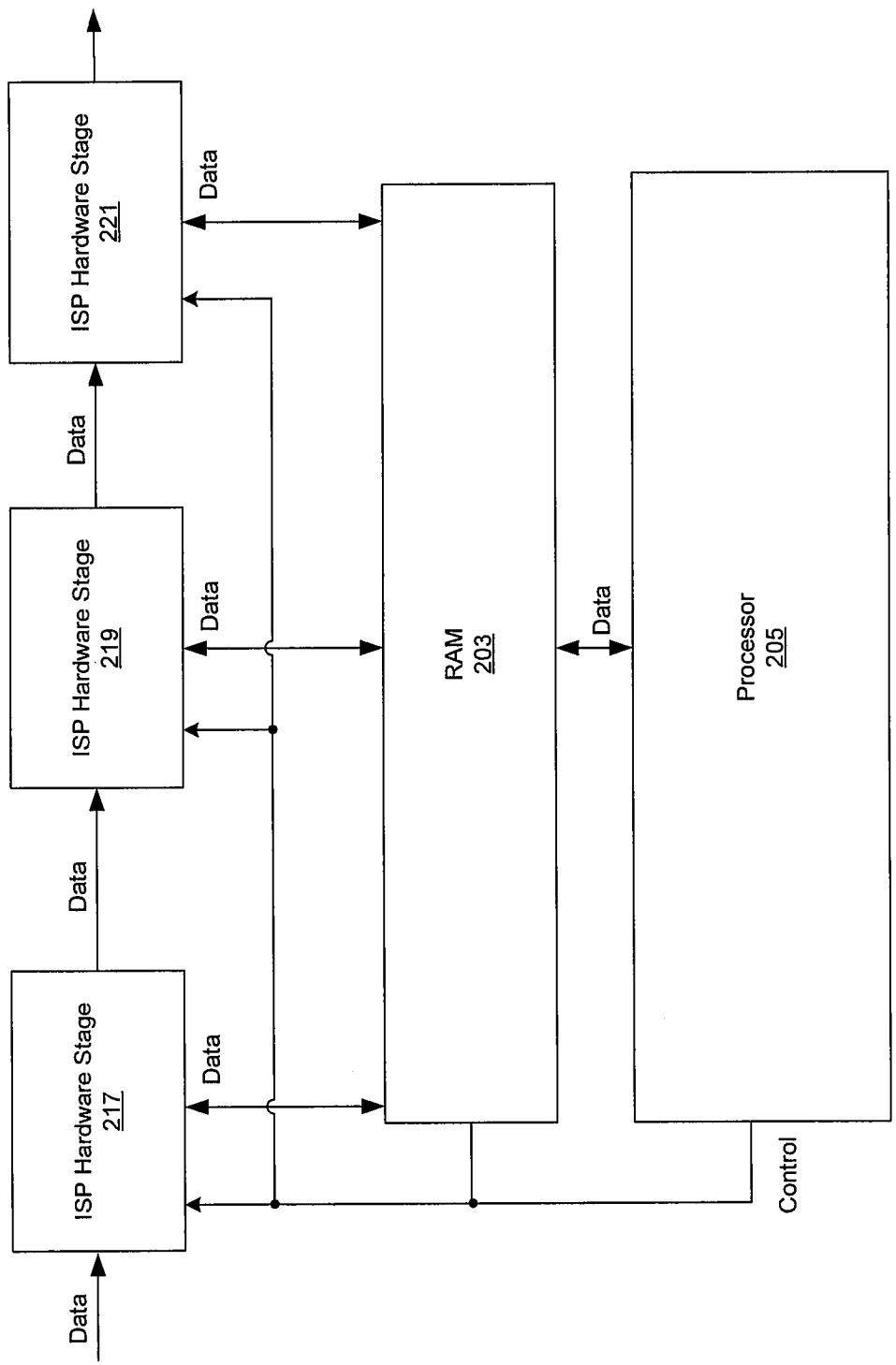
FIG. 2B is a block diagram of an exemplary portion of a hardware ISP configured for insertion of software processing between hardware ISP stages, in accordance with an embodiment of the invention.

FIG. 2B is a block diagram of an exemplary portion of a hardware ISP configured for insertion of software processing between hardware ISP stages, in accordance with an embodiment of the invention. Referring to FIG. 2B, there is shown three hardware ISP processing stages 217, 219 and 221, a random access memory (RAM) 203, and a processor 205. The processor 205 and RAM 203 may be similar or substantially the same as the processor 205 and RAM 203 described in FIG. 2A.

The hardware ISP processing stages 217, 219 and 221 may each perform an image processing task that may comprise, for example, dark pixel compensation, lens shading correction, white balance and gain control, defective pixel correction, resampling, crosstalk correction, bayer denoising, demosaicing, gamma correction, YCbCr denoising, false color suppression, sharpening, distortion correction, high resolution resize, color processing, color conversion, low resolution resize and/or output formatting for example. The hardware ISP stages 217, 219 and 221 may each be communicatively coupled with a previous hardware ISP processing stage and/or a subsequent hardware ISP processing stage as well as the RAM 203 and the processor 205.

In operation, the hardware ISP processing stages 217, 219 and 221 may represent a portion of the processing stages comprised within the hardware ISP 209 described in FIG. 2A. Accordingly, the hardware ISP processing stages 217, 219 and 221 may comprise suitable circuitry, logic and/or code to enable processing of image data received from the image source 201, to receive control signals from the processor 205 and to send and receive image data to and from the RAM 203. Image processing software may be stored in the RAM 203 and executed by the processor 205. In this regard, a unit of image data may be processed sequentially via the hardware ISP processing stages 217, 219 and 221 and/or may be passed to the processor 205 for software image processing before and/or after one or more of the hardware ISP processing stages 217, 219 and 221. In some embodiments of the invention, the processor 205 may issue commands to the hardware ISP 209 to process a unit of image data within stage 217 and to send output to RAM 203. The processor 205 may retrieve and software process the hardware ISP stage 217 output from RAM 203 and may send software processing output to RAM 203. The processor 205 may issue commands to the ISP stage 219 to retrieve and process the software processing output from RAM 203 and send its output to hardware ISP processing stage 221 for additional processing. The processor 205 may issue commands to the hardware ISP stage 221 to retrieve and process output from the hardware ISP stage 219. Moreover, multiple units of image data may be processed simultaneously within the hardware ISP stages 217, 219, 221 and one or more processing cores in processor 205.

Figure 3:
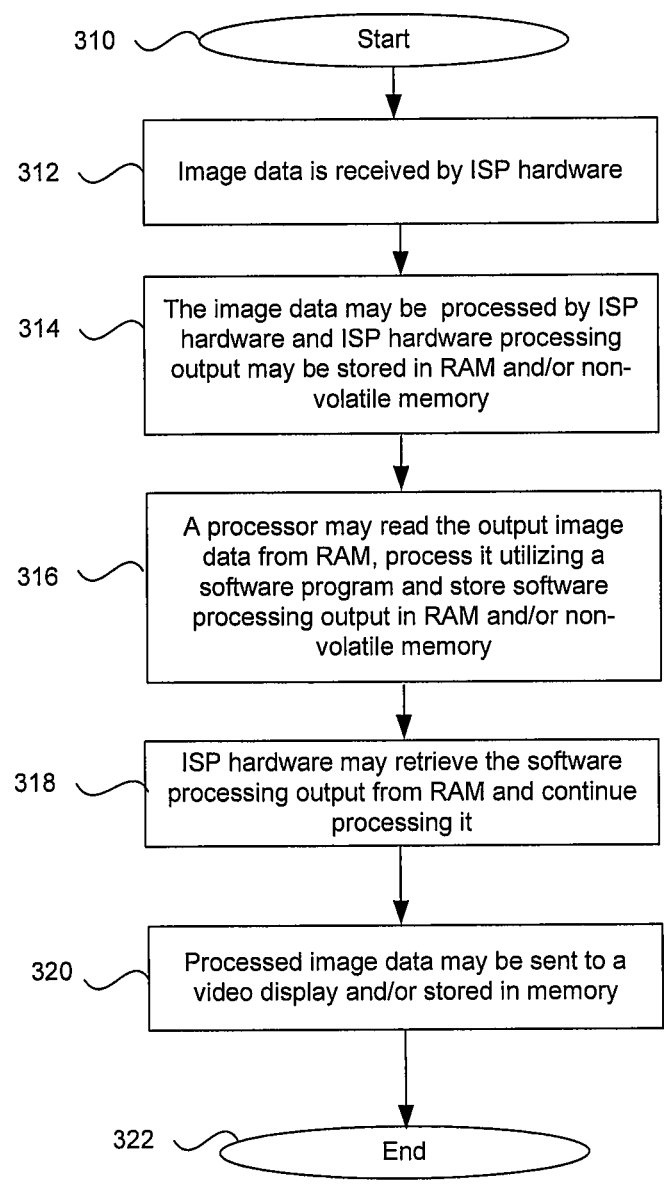
FIG. 3 is a flow chart illustrating exemplary steps for processing image data via a hardware ISP with software processing steps inserted between hardware ISP processing stages, in accordance with an embodiment of the invention.

FIG. 3 is a flow chart illustrating exemplary steps for processing image data via a hardware ISP with software processing inserted between hardware ISP processing stages, in accordance with an embodiment of the invention. Referring to FIG. 3, after start step 310, in step 312 the hardware ISP 209 may receive a unit of image data from the image source 201. In step 314, the hardware ISP 209 may process the unit of image data and may output processed image data to the RAM 203. In step 316, the processor 205 may read the hardware ISP 209 output processed image data from the RAM 203 and may process it utilizing software. Image data output from software processing may be stored in the RAM 203. In step 318, the hardware ISP may retrieve the image data output from software processing in RAM 203 and may perform additional processing steps on it. In step 320, processed image data may be sent to a video display or stored in memory. In step 322 is the end step.

In an embodiment of the invention, image data is processed via one or stages by a hardware image sensor pipeline 209 (ISP) wherein one or more software processing steps may be inserted at any point within the hardware ISP 209. Output from any stage of the hardware ISP 209 may be stored in RAM 203. Stored hardware ISP 209 output may be retrieved from RAM 203 and processed via one or more software processes. Results from the one or more software processes may be stored in RAM 203 and communicated to any stage of the hardware ISP 209 for additional processing. In this regard, the hardware ISP 209 and one or more processors within the processing block 205 may simultaneously process portions of image data. In addition, the ISP 209 and the one or more processors within the processing block 205 may be integrated within a chip.

Certain embodiments of the invention may comprise a machine-readable storage having stored thereon, a computer program having at least one code section for inserting software processing in a hardware image sensor pipeline, the at least one code section being executable by a machine for causing the machine to perform one or more of the steps described herein.

Accordingly, aspects of the invention may be realized in hardware, software, firmware or a combination thereof. The invention may be realized in a centralized fashion in at least one computer system or in a distributed fashion where different elements are spread across several interconnected computer systems. Any kind of computer system or other apparatus adapted for carrying out the methods described herein is suited. A typical combination of hardware, software and firmware may be a general-purpose computer system with a computer program that, when being loaded and executed, controls the computer system such that it carries out the methods described herein.

One embodiment of the present invention may be implemented as a board level product, as a single chip, application specific integrated circuit (ASIC), or with varying levels integrated on a single chip with other portions of the system as separate components. The degree of integration of the system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor may be implemented as part of an ASIC device with various functions implemented as firmware.

The present invention may also be embedded in a computer program product, which comprises all the features enabling the implementation of the methods described herein, and which when loaded in a computer system is able to carry out these methods. Computer program in the present context may mean, for example, any expression, in any language, code or notation, of a set of instructions intended to cause a system having an information processing capability to perform a particular function either directly or after either or both of the following: a) conversion to another language, code or notation; b) reproduction in a different material form. However, other meanings of computer program within the understanding of those skilled in the art are also contemplated by the present invention.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A method for processing images, the method comprising:
   performing by a hardware image sensor pipeline (ISP) comprising a plurality of hardware processing stages:
   processing image data via one or more steps in a first stage of said plurality of hardware processing stages to generate a first processed image data, the first stage being communicatively coupled to a memory, a second stage of the plurality of hardware processing stages, and a processor, the second stage being subsequent to the first stage;
   receiving a signal from the processor indicating whether to store the first processed image data in the memory;
   in response to the signal having a first signal status:
      outputting said first processed image data from a first output of the first stage of said plurality of hardware processing stages to the memory for access by the processor which performs one or more software processing steps or stages on said first processed image data to generate a second processed image data;
   in response to the signal having a second signal status:
      outputting said first processed image data from a first output of the first stage of said plurality of hardware processing stages to an input of the second stage without storing the image data in the memory to operate on said first processed image data to generate a second processed image data.

2. The method according to claim 1, comprising storing said first processed image data output from said one or more of said plurality of hardware processing stages of said hardware ISP.

3. The method according to claim 1, wherein said processor controls one or more of:
   said processing said image data via said one or more of said plurality of hardware processing stages of said hardware image sensor pipeline;
   said outputting of said first processed image data from said output of said one or more of said plurality of hardware processing stages,
   said storing of said first processed image data,
   said retrieving of said first processed image data by said processor;
   said storing of said second processed image data by said processor; and
   said receiving of said second processed image data at an input of one or more of said plurality of hardware processing stages of said hardware image sensor pipeline; and
   said processing of said second processed image data by said hardware image sensor pipeline.

4. The method according to claim 1, wherein said hardware ISP and said processor are integrated within a chip.

5. A system for processing images, the system comprising:
   one or more circuits comprising a hardware image sensor pipeline (ISP) comprising a plurality of processing stages, said one or more circuits being operable to:
   process image data via a first stage of a plurality of processing stages to generate a first processed image data, the first stage being communicatively coupled to a memory, a second stage, and a processor, the second stage being subsequent to the first stage;
   receive a first signal from the processor;
   in response to the first signal having a first signal status:
   receive said first processed image data at an input of the second stage of said plurality of processing stages of said hardware image sensor pipeline from the memory;
   in response to the first signal having a second signal status:
   receive said first processed image data at an input of the second stage of the plurality of processing stages of the hardware image sensor pipeline from the first stage of the plurality of processing stages of the hardware image sensor pipeline, without storing the image data in the memory.

6. The system according to claim 5, wherein said one or more circuits enables storage of said first processed image data output from one or more of said plurality of processing stages of said hardware ISP.

7. The system according to claim 6, wherein said processor retrieves said stored said first processed image data for handling via said one or more software processing steps or stages.

8. The system according to claim 7, wherein said processor stores said generated second processed image data.

9. The system according to claim 8, wherein said one or more circuits enables receiving as input said stored said generated second processed image data, by any of said one or more of said plurality of processing stages of said hardware ISP for processing.

10. The system according to claim 9, wherein said processor controls one or more of:
   said processing said image data via said one or more of said plurality of processing stages of said hardware image sensor pipeline;
   said outputting of said first processed image data from said output of said one or more of said plurality of processing stages,
   said storing of said first processed image data,
   said retrieving of said first processed image data by said processor;
   said storing of said second processed image data by said processor; and
   said receiving of said second processed image data at an input of one or more of said plurality of processing stages of said hardware image sensor pipeline; and said processing of said second processed image data by said hardware image sensor pipeline.

11. A non-transitory machine-readable storage having stored thereon, a computer program having at least one code section for processing images, the at least one code section being executable by a machine for causing the machine to perform steps comprising:
performing by a hardware image sensor pipeline (ISP) comprising a plurality of hardware processing stages:
processing image data in a tiled format via one or more steps or of said plurality of hardware processing stages to generate a first processed image data;
outputting said first processed image data from an output of one or more of said plurality of hardware processing stages to an input of one or more of said plurality of hardware processing stages of said hardware image sensor pipeline, without storing the image data in a common memory.

12. The non-transitory machine-readable storage according to claim 11, wherein said at least one code section comprises code that enables storing of said first processed image data output from said one or more of said plurality of hardware processing stages of said hardware ISP.

13. The non-transitory machine-readable storage according to claim 12, wherein said processor retrieves said stored said first processed image data for handling via said one or more software processing steps or stages.

14. The non-transitory machine-readable storage according to claim 11, wherein said at least one code section comprises code that enables receiving as input said stored said generated second processed image data, by any of said one or more of said plurality of hardware processing stages of said hardware ISP for processing.

15. The method according to claim 1, further comprising processing said received second processed image data by any of said plurality of hardware processing stages.

16. The system according to claim 5, wherein said one or more circuits are operable to process said received second processed image data by any of said plurality of hardware processing stages.

17. The non-transitory machine-readable storage according to claim 11, wherein the steps further comprise processing by said received second processed image data by any of said plurality of hardware processing stages.

18. The method according to claim 1, further comprising outputting a third processed image data from a second output of the second stage to the processor, the second stage communicatively coupled to the memory and the processor.

19. The method according to claim 18, wherein the processor performs one or more software processing steps or stages on said third processed image data to generate a fourth processed image data.

20. The method according to claim 19, further comprising receiving a fourth processed image data at a third input of a third stage of said plurality of hardware processing stages of said hardware image sensor pipeline, the third stage communicatively coupled to the second stage and occurring subsequent to the second stage.

21. The method according to claim 20, wherein the first stage, the second stage, and the third stage simultaneously process portions of the image data.

22. The system according to claim 5, further comprising outputting a third processed image data from a second output of the second stage to the processor, the second stage communicatively coupled to the memory and the processor.

23. The system according to claim 22, wherein the processor comprises plurality of processing cores operable to process a plurality of software processing steps concurrently within the plurality of processing cores, the plurality of processing steps corresponding to the first processed image data and the third processed image data.

24. The system according to claim 5, wherein the one or more circuits are further operable to:
process the first processed image data in the second stage of the plurality of processing stages to generate a second processed image data;
receive a second signal from the processor indicating whether to store the second processed image data in the memory;
in response to the second signal having the first signal status:
outputting the second processed image data from a first output of the second stage of said plurality of processing stages to the memory for access by the processor which performs one or more software processing steps or stages on said second processed image data;
in response to the second signal having the second signal status:
outputting said second processed image data from a first output of the second stage of said plurality of processing stages to a third stage of the plurality of processing stages to operate on said second processed image data.

* * * * *